(12) United States Patent
Suzuki

(10) Patent No.: US 7,035,232 B1
(45) Date of Patent: Apr. 25, 2006

(54) SPREAD-SPECTRUM COMMUNICATION METHOD AND APPARATUS

(75) Inventor: Rie Suzuki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 907 days.

(21) Appl. No.: 09/661,152

(22) Filed: Sep. 13, 2000

Related U.S. Application Data

(62) Division of application No. 08/974,964, filed on Nov. 20, 1997.

(30) Foreign Application Priority Data

Dec. 3, 1996 (JP) .................................. 8/322713

(51) Int. Cl.
*H04B 7/216* (2006.01)

(52) U.S. Cl. ..................................... 370/320; 370/350

(58) Field of Classification Search ................ 370/320, 370/350, 324, 312, 337, 514, 342, 344, 346, 370/347, 503, 321; 375/259
See application file for complete search history.

(56) References Cited

U.S. PATENT DOCUMENTS

| | | | |
|---|---|---|---|
| 4,247,945 A | 1/1981 | Seibel | 375/114 |
| 4,958,359 A | 9/1990 | Kato | 375/1 |
| 5,163,070 A | 11/1992 | Bielby et al. | 375/115 |
| 5,260,969 A | 11/1993 | Kato et al. | 375/1 |
| 5,504,774 A * | 4/1996 | Takai et al. | 375/134 |
| 5,537,396 A | 7/1996 | Kanda et al. | 370/18 |
| 5,590,160 A * | 12/1996 | Ostman | 375/367 |
| 5,596,599 A | 1/1997 | Saito | 375/200 |
| 5,668,803 A | 9/1997 | Tymes et al. | 370/312 |
| 5,668,829 A | 9/1997 | Saito | 375/208 |
| 5,805,581 A | 9/1998 | Uchida et al. | 370/335 |
| 5,856,997 A | 1/1999 | Mochizuki et al. | 345/200 |
| 5,875,218 A | 2/1999 | Barham et al. | 375/376 |
| 5,917,850 A | 6/1999 | Fujita et al. | 375/200 |
| 5,974,083 A | 10/1999 | Fujita | 375/208 |
| 5,978,412 A * | 11/1999 | Takai | 375/145 |
| 6,084,905 A | 7/2000 | Ishifuji et al. | 375/202 |

FOREIGN PATENT DOCUMENTS

| | | |
|---|---|---|
| DE | 43 29 317 | 3/1995 |
| EP | 0 603 788 | 6/1994 |
| EP | 0 605 188 | 7/1994 |
| EP | 0 652 680 | 5/1995 |
| EP | 0 676 908 | 10/1995 |

(Continued)

OTHER PUBLICATIONS

Ue, T. et al., "Performance of Symbol Rate and Modulation Level Controlled Adaptive Modulation System", Technical Report of IEICE, RCS95-30, pp. 25-30. (English Abstract Included).

(Continued)

*Primary Examiner*—Chi Pham
*Assistant Examiner*—Alexander O. Boakye
(74) *Attorney, Agent, or Firm*—Fitzpatrick, Cella, Harper & Scinto

(57) ABSTRACT

The communication period of spread spectrum data is divided into a plurality of portions, and an adjustment period for receiving the spread spectrum data is provided between one data-communication period and another communication period. Thereby, the setting of a receiving end is adjusted in the adjustment period after the spread spectrum data is received in one data-communication period.

19 Claims, 12 Drawing Sheets

FOREIGN PATENT DOCUMENTS

| | | |
|---|---|---|
| EP | 0 726 658 | 8/1996 |
| JP | 7-177126 | 7/1995 |
| JP | 7-336271 | 12/1995 |
| JP | 8-237169 | 9/1996 |
| JP | 8-265215 | 10/1996 |
| JP | 8-298682 | 11/1996 |

OTHER PUBLICATIONS

J. Blanz, et al., "Realistic Simulation of CDMA Mobile Radio Systems Using Joint Detection and Coherent Receiver Antenna Diversity", Spread Spectrum Techniques And Applications, 1994. IEEE ISSSTA '94. IEEE Third International Symposium On Oulu, Finland, Jul. 4-6, 1994, New York, NY, pp 193-197.

Y. Liu, et al., "A Soft-Output Bidirectional Decision Feedback Equalization Technique for TDMA Cellular Radio", IEEE Journal On Selected Areas In Communications, IEEE Inc. New York, US. vol. 11, No. 7, pp. 1034-1045, Sep. 1, 1993.

* cited by examiner

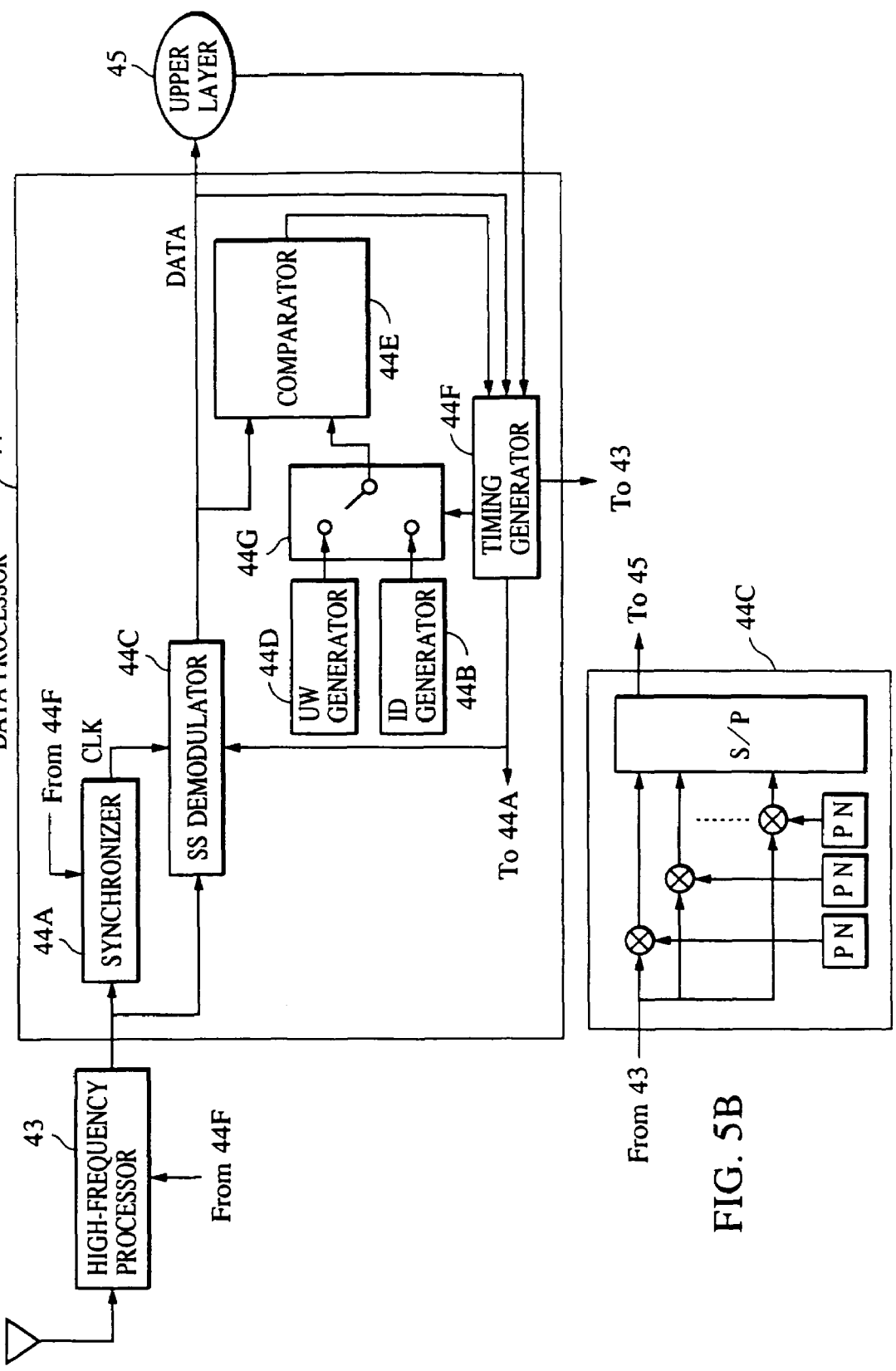

SPREAD-SPECTRUM COMMUNICATION METHOD AND APPARATUS

This application is a division of application Ser. No. 08/974,964, filed on Nov. 20, 1997.

BACKGROUND OF THE INVENTION

1. Field of the Invention

The present invention relates to a spread-spectrum communication method and apparatus.

2. Description of the Related Art

In a time-sharing communication method for converting data to bursts, in order to receive and demodulate data bursts it is necessary to establish synchronization with the data bursts to be received. It is also necessary that only desired information addressed to the receiving end be detected and extracted from the received signals. In addition, conflict between one station and another station must be avoided. Accordingly, in general, in such a communication method data is transmitted in accordance with a regular format.

FIG. 1 shows an example of a format for a data burst in the above communication method. For example, data bursts each include a preamble consisting of a synchronization code (SY), a unique word (UW) and a station-identification code (ID), and data (DA). Between the data bursts there is a guard time (GT).

A receiving end which receives the data bursts uses the synchronization code in the preamble period to perform reproduction of a carrier, input of automatic gain control (AGC), establishment of clock synchronization, and so forth. The receiving end further detects the unique word (UW) and the station-identification code (ID), and when it perceives that the successive data (DA) is desired data addressed to itself, it holds a reproduced carrier, AGC, clock synchronization and so forth until the data terminates, and it demodulates the data.

However, this communication method causes an error in the reference clock frequency between the transmitting and receiving ends. Thus, with the lapse of time, the receiving end's clock which has held the established synchronization in the preamble, also has increased synchronization errors with respect to the transmitting end's clock. In addition, for example, if the transmission line is wireless, communication quality may vary with time, which results in the possibility of the input AGC held in the preamble losing its optimum condition with the lapse of time. According to this communication method, the maximum time during which data can be transmitted with one data burst is limited by the time during which synchronization precision, AGC precision and so forth can be maintained.

According to the above communication method, when a large amount of digital data (e.g., image data or the like) adapted for recent multimedia applications is transmitted, as shown in FIG. 2, data is divided into a plurality of portions, and the complete data must be transmitted as a plurality of data bursts. As a result, the preamble time and the guard time with respect to the time used for transmission of the actual data increases, and there is the possibility of an interrupting burst from another station occurring between the divided data bursts. Consequently, the data throughput deteriorates.

In order to extend the maximum time during which the data can be transmitted with one data burst, a precise frequency oscillator, and a complicated synchronization circuit or AGC must be used, which disadvantageously requires an expensive, large-sized apparatus.

SUMMARY OF THE INVENTION

Accordingly, it is an object of the present invention to provide a spread-spectrum communication method and apparatus having a high throughput.

It is another object of the present invention to provide a spread-spectrum communication method and apparatus adapted for performing large-amount data communication.

It is a further object of the present invention to provide a spread-spectrum communication method and apparatus in which an adjustment period for receiving spread spectrum data is provided in a period for transmitting spread spectrum data.

It is a still further object of the present invention to provide a spread-spectrum communication method and apparatus which communicate an adjustment signal for adjusting reception of spread spectrum data in a plurality of divided data-communication periods.

Other objects of the present invention will be apparent from the embodiments described below, based on the attached drawings.

To this end, according to a first aspect of the present invention, the foregoing objects have been achieved through provision of a spread spectrum communication method comprising the steps of: dividing a communication period for spread spectrum data into a plurality of communication periods; and providing an adjustment period for receiving the spread spectrum data between one data-communication period and another data-communication period.

The spread spectrum communication method may further comprise the step of synchronizing a spread code in the adjustment period.

The spread spectrum communication method may further comprise the step of providing the adjustment period prior to the plurality of data-communication periods.

The spread spectrum communication method may further comprise the step of holding the adjusted setting of the receiving end in the data-communication period.

The spread spectrum communication method may further comprise the step of holding gain in the data-communication period.

The spread spectrum communication method may further comprise the step of communicating code-division-multiplexed data in the data-communication period.

The spectrum communication method further comprising the step of providing the adjustment period prior to the plurality of data-communication periods, may still further comprise the steps of establishing the setting of a receiving end in the adjustment period prior to the plurality of data communication periods; and correcting the established setting in the adjustment period between one data-communication period and the next data-communication period.

Preferably, in the spread spectrum communication method further comprising the step of providing the adjustment period prior to the plurality of data-communication periods, the gain for the adjustment in the adjustment period prior to the plurality of data-communication periods is larger than the gain for the adjustment in the adjustment period between the one data-communication period and the next data-communication period.

Preferably, in the spread spectrum communication method further comprising the step of providing the adjustment period prior to the plurality of data-communication periods, an adjusting signal communicated in the adjustment period prior to the plurality of data-communication periods is longer than an adjusting signal communicated in the adjustment period between the one data-communication period and the next data-communication period.

The spread spectrum communication method further comprising the step of communicating code-division-multiplexed data in the data-communication period may further comprise the step of communicating a signal not multiplexed by code division multiplexing, in the adjustment period.

According to a second aspect of the present invention, the foregoing objects have been achieved through provision of a spread spectrum communication apparatus comprising: data communication means for communicating spread spectrum data in a plurality of divided data-communication periods; and adjustment-signal communication means for communicating an adjustment signal for adjusting reception of spread spectrum data between one data-communication period and another communication period.

The spread spectrum communication apparatus may further comprise adjustment means for establishing the setting of a receiving end in accordance with the adjustment signal prior to the plurality of data-communication periods and correcting the established setting in accordance with the adjustment means between the one data-communication period and the next data-communication period.

The spread spectrum communication apparatus may further comprise holding means for holding the setting of the receiving end in the data-communication period.

BRIEF DESCRIPTION OF THE DRAWINGS

FIGS. 5A and 5B are block diagrams showing a receiving end in an embodiment of the present invention.

DESCRIPTION OF THE PREFERRED EMBODIMENTS

Figure 1:
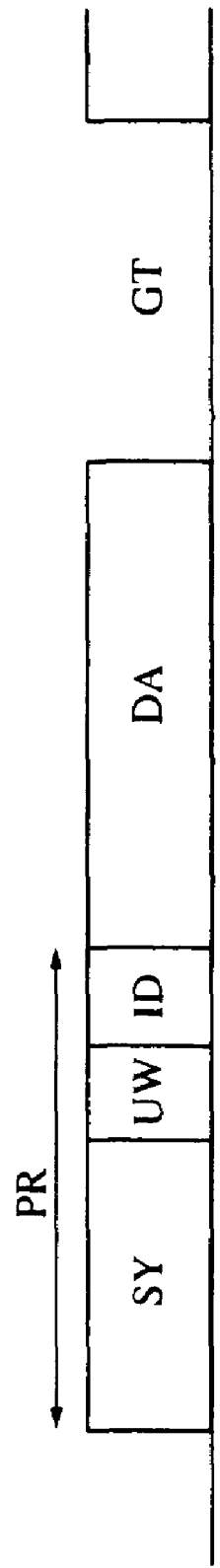
FIG. 1 is a chart showing details of the format of a data burst according to the related art.
Figure 2:
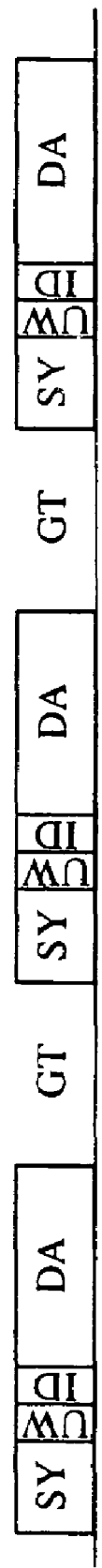
FIG. 2 is a chart showing a case where a large amount of data is transmitted in the related art.
Figure 3:
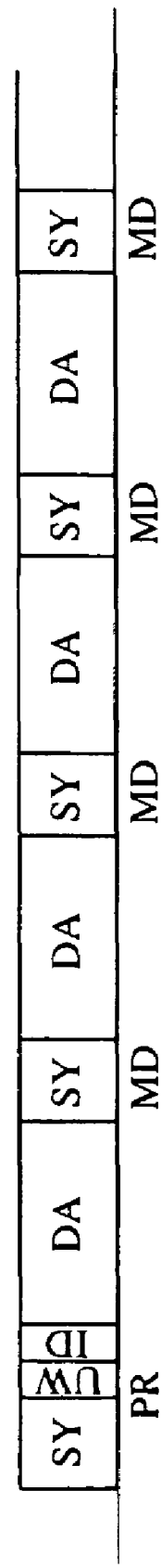
FIG. 3 is a chart showing the format of a data burst according to a first embodiment of the present invention.

FIG. 3 shows the format of a data burst according to a first embodiment of a digital communication method of the present invention. For example, the data burst having a train-type data-burst structure includes a preamble (PR), data (DA) and one or a plurality of what will, hereinafter, be termed "mid-ambles" (MD). The preamble (PR) includes a synchronization code (SY), a unique word representing the start of received data, and a station-identification code (ID) showing which station the information is addressed to. The mid-amble (MD) includes a synchronization code (SY).

The length of the data (DA) is equal to the maximum duration of data capable of being transmitted with one data burst, which is limited by a time during which synchronous precision or AGC precision in the related art can be maintained.

Figure 4A:
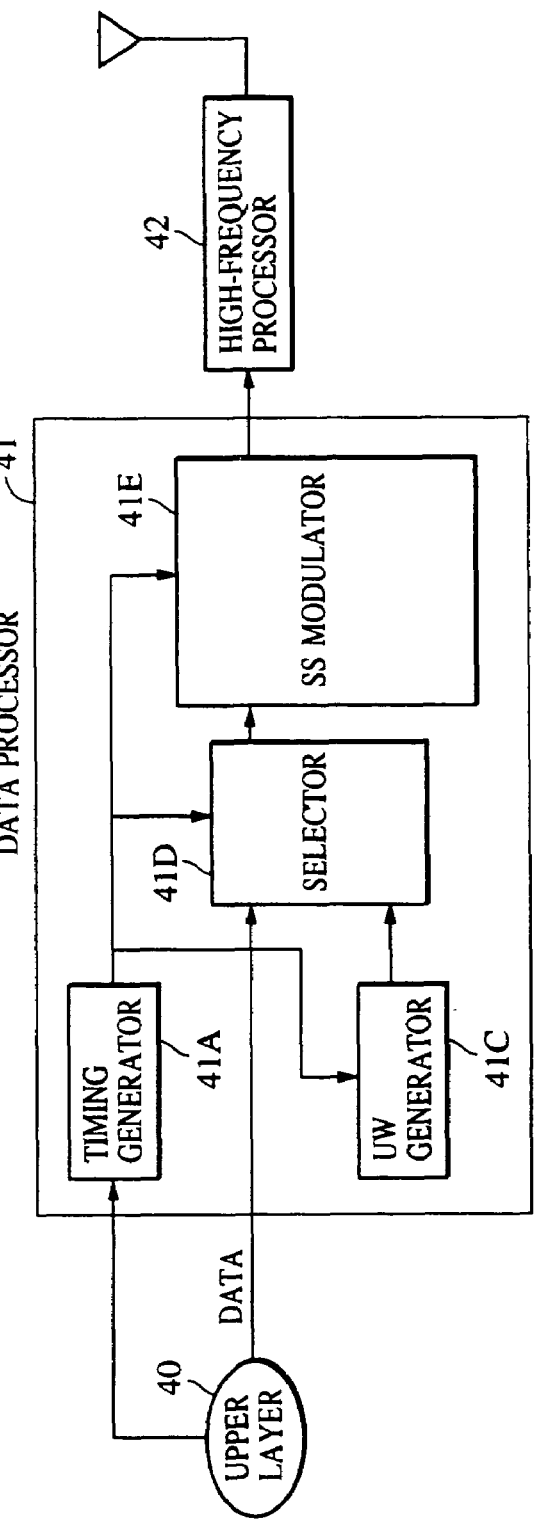
FIGS. 4A and 4B are block diagrams showing a transmitting end in an embodiment of the present invention.

FIGS. 4A, 4B, 5A and 5B show the diagrams of a transmitting end and a receiving end according to the first embodiment of the present invention. As shown in FIG. 4A, a data processor 41 in the transmitting end generates a data burst as shown in FIG. 3 in accordance with a command from an upper layer 40, and sends the data burst as a spread spectrum signal to a transmission line via a high-frequency processor 42. Information data (DA), a station-identification code (ID), a status indicator (ST) (shown in FIG. 10) and so forth are sent as data from the upper layer 40 into the data processor 41 shown in FIG. 4A. A timing generator 41A shown in FIG. 4B generates each predetermined timing involved in constructing the data burst. In accordance with the timing generated by the timing generator 41A, an SS modulator 41E outputs the synchronization code (SY) without modulating it in the synchronization-code (SY) period. Also, in the unique-word (UW) period a selector 41D selects a transmission signal from a signal series "0101 . . . " generated from a UW generator 41C in accordance with the timing generated by the timing generator 41A. The SS modulator 41E performs the spread modulation of the output of the selector 41D, and the modulated output is sent as a spread spectrum signal to the transmission line via the high-frequency processor 42. In the synchronization-code (SY) period the selector 41D operates so that the SS modulator 41E is not supplied with the signals from the upper layer 40 and the UW generator 41C.

At this time the timing generator 41A has control such that the synchronization code (SY) is output from the SS modulator 41E in the SY period, the unique word (UW) is output from the UW generator 41C in the unique-word (UW) period among the other periods, and the station-identification code (ID), the status (ST) and the data (DA) are output from the upper layer 40.

Figure 6:
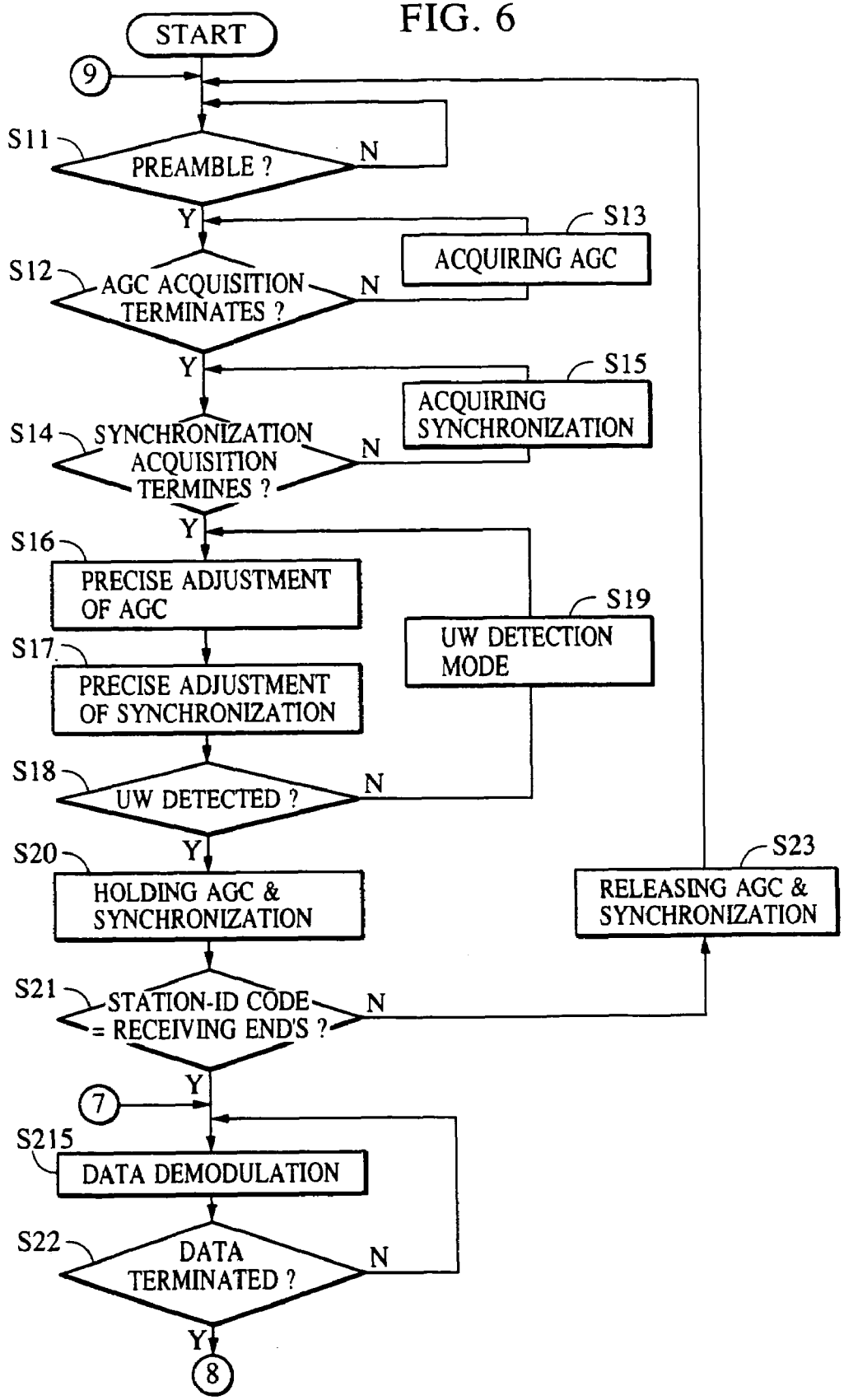
FIG. 6 is a flowchart showing a case where a preamble is being received in the first embodiment of the present invention.
Figure 7:
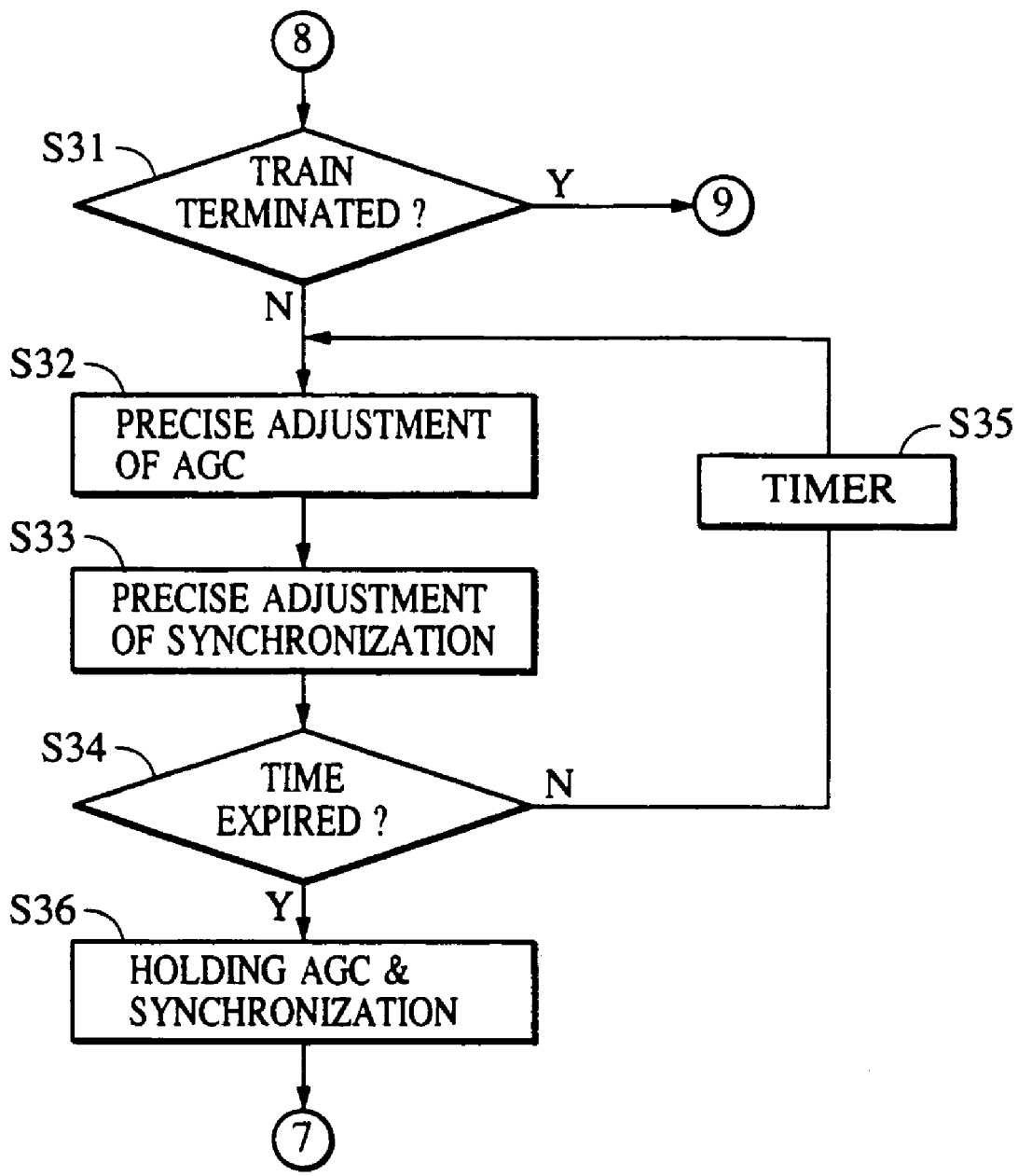
FIG. 7 is a flowchart showing a case where a mid-amble is being received in the first embodiment of the present invention.

FIGS. 6 and 7 show flowcharts of the operation of the receiving end when it has received the above-described data burst. FIG. 6 shows a condition in which the preamble (PR) is being received, while FIG. 7 shows a condition in which the mid-amble (MD) is being received.

When the receiving end, having received the spread-spectrum data burst, receives the synchronization code (SY) of the preamble (PR) in step S11, the AGC is acquired by a high-frequency processor 43 in steps S12 and S13, and clock synchronization is established by a synchronizer 44A in accordance with the synchronization code in steps S14 and S15. In the successive steps S16 and S17, while the AGC and the clock synchronization are fine-adjusted, the unique word (UW) is detected by a comparator 44E in steps S18 and S19. In an initial condition a selector 44G selects a UW generator 44D. When the comparator 44E detects the unique word (UW), in step S20 a timing generator 44F holds the AGC and the clock synchronization by the high-frequency processor 43 and the synchronizer 44A, and switches the selector 44G to an ID generator 44B in step S21. In step S21, the comparator 44E detects the station-identification code (ID), and when it recognizes that the received data is desired data addressed to the receiving end (i.e., to this particular receiver), the timing generator 44F causes a demodulator 44C to demodulate the data (DA) in step S215.

Termination of the data (DA) in step S22 is followed by determination of whether or not the next group of data (DA) is being received in step S31. If the next data (DA) is being received (or has arrived in its entirely), reception of the synchronization code (SY) of the mid-amble (MD) causes the timing generator 44F to perform fine adjustment of the AGC by the high-frequency processor 43 in step S32, fine phase adjustment of the clock signal by the synchronizer 44A in step S33, and so forth. An upper layer 45 informs the timing generator 44F whether the data has terminated or whether a following mid-amble has been received, in step S31. Since acquisition of the clock synchronization and the AGC has been established in the preamble (PR) period, the clock synchronization in the mid-amble (MD) period is sufficiently achieved by only phase correction, and the initial acquisition of the AGC is not needed. Accordingly, the synchronization code in the mid-amble (MD) period may be shorter than the synchronization code in preamble (PR) period. The high-frequency processor 43 increases the gain to cause the rapid acquisition of the AGC in step S13, and decreases the gain to perform fine adjustment of the AGC in step S16 or S32. After the lapse of a predetermined time, the timing generator 44F holds the AGC and the clock synchronization by the high-frequency processor 43 and the synchronization unit 44 in step S36, and causes an SS demodulator 44C to demodulate the data (DA) in step S215. The receiving end performs the above processes until the train terminates.

In this manner, according to the first embodiment, even when a large amount of digital data is sent, the data can be transmitted without separating it into a plurality of data bursts. In this case the need for a plurality of conventionally required unique words (UW), station-identification codes (ID) and guard times (GT) is eliminated, and there is no possibility that interrupting bursts from another station occur. Consequently, improving the data throughput itself is realized.

Figure 8:
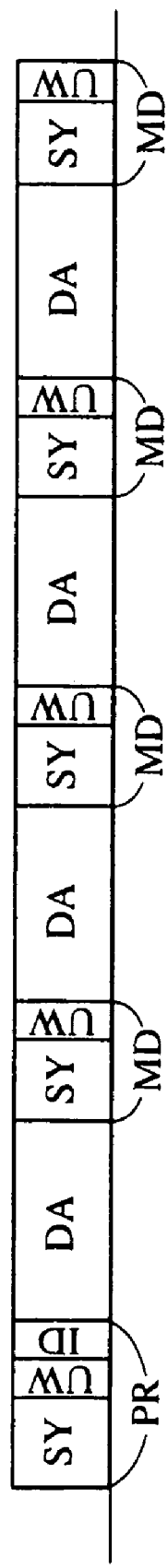
FIG. 8 is a chart showing the format of data bursts in a second embodiment of the present invention.

FIG. 8 shows the format of a data burst according to a second embodiment of the present invention.

The data burst according to the second embodiment has a train-type data-burst structure including a preamble (PR), data (DA) and one or a plurality of mid-ambles (MD). The preamble (PR) includes a synchronization code (SY), a unique word (UW) and a station-identification code (ID). Each mid-amble includes a synchronization code (SY) and a unique word (UW).

The structure used with this format is identical to that shown in FIGS. 4A, 4B, 5A and 5B.

Figure 9:
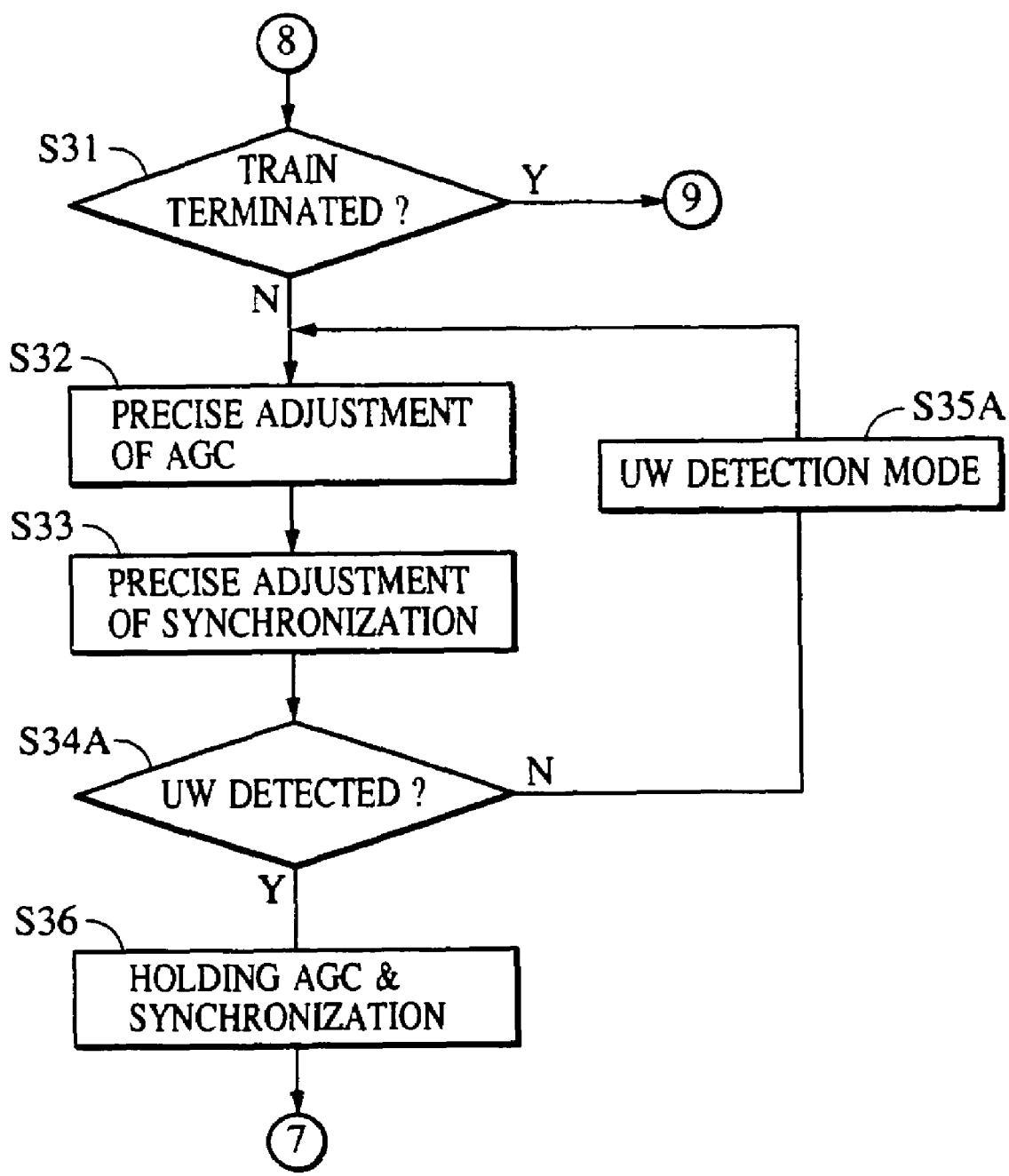
FIG. 9 is a flowchart showing a case where a mid-amble is being received in the second embodiment of the present invention.

FIG. 9 shows a flowchart of the operation of the receiving end in handling such a data burst, and in particular, the mid-amble (MD). The operation of the receiving end while receiving the preamble (PR) is identical to that shown in FIG. 6.

In a case where there are successive groups of data (DA), when the synchronization code (SY) of the mid-amble (MD) is received in step S31, the high-frequency processor 43 performs fine adjustment of AGC in step S32 and the synchronizer 44A performs fine phase adjustment of the clock signal and so forth in step S33. Here, since the acquisition of the clock synchronization and the AGC has been established in the preamble (PR) period, the clock synchronization in the mid-amble (MD) period is sufficiently achieved by only phase correction, and the initial acquisition of the AGC is not necessary. Accordingly, the synchronization code in the mid-amble (MD) period may be shorter than the synchronization code in the preamble (PR) period. While the AGC and the clock synchronization are being fine-adjusted in steps S32 and S33, the unique word (UW) is detected by the comparator 44E in steps S34A and S35A. When the mid-amble is received, the timing generator 44F switches the selector 44G to the UW generator 44D. When the comparator 44E detects the unique word (UW), the timing generator 44F holds the AGC and the clock synchronization by the high-frequency processor 43 and the synchronization unit 44 in step S36, and causes the SS demodulator 44C to demodulate the data in step S215.

Therefore, even when a large amount of digital data is sent, the need for a plurality of conventionally required station-identification codes (ID) and guard times (GT) is eliminated, and there is no possibility that interrupting bursts from another station occur. Consequently, improving the data throughput itself is realized.

Here, although inserting the unique word (UW) in the mid-amble (MD) slightly decreases the total throughput, it is effective in improving data-start detection precision after each mid-amble (MD).

Figure 10:
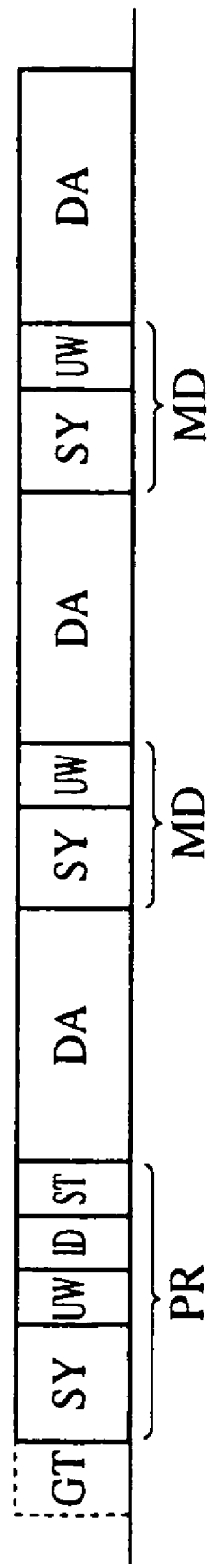
FIG. 10 is a chart showing the format of data bursts according to a third embodiment of the present invention.

FIG. 10 shows the format of a data burst according to a third embodiment of the present invention. For example, the data burst has a train type data-burst structure including data (DA) as information to be originally sent, a guard time (GT) provided before the start of sending in order to avoid conflict, a preamble (PR), and one or a plurality of mid-ambles (MD) in data transmission. The preamble (PR) includes a synchronization code (SY), a unique word (UW) as a signal series of "0101 . . . " representing the start of received data, station-identification code (ID) showing which station the information is addressed to, and a status indicator (ST) as information about the length of the data, the type of data and the number of data groups included in one train (three groups of data in FIG. 10). The mid-amble (MD) includes a synchronization code (SY) and a unique word (UW).

The structure described in the third embodiment is identical to those shown in FIGS. 4A, 4B, 5A and 5B.

The receiving end which received the data burst causes the data processor 44 to establish synchronization by means of the high-frequency processor 43 shown in FIG. 5A and to demodulate the data. In the data processor 44, a demodulation clock signal with synchronization established in the synchronization code (SY) period is used to perform reverse spread demodulation in the SS demodulator 44C, and the comparator 44E compares the signal series of "0101 . . . " generated from the UW generator 44D and the demodulated data. If the output data of the SS demodulator 44C coincides with the unique word (UW) from the UW generator 44D, the timing generator 44F generates each predetermined timing included in the data burst, and sends the information data (DA), the station-identification code (ID), the status (ST) and so forth to the upper layer 45.

Figure 11:
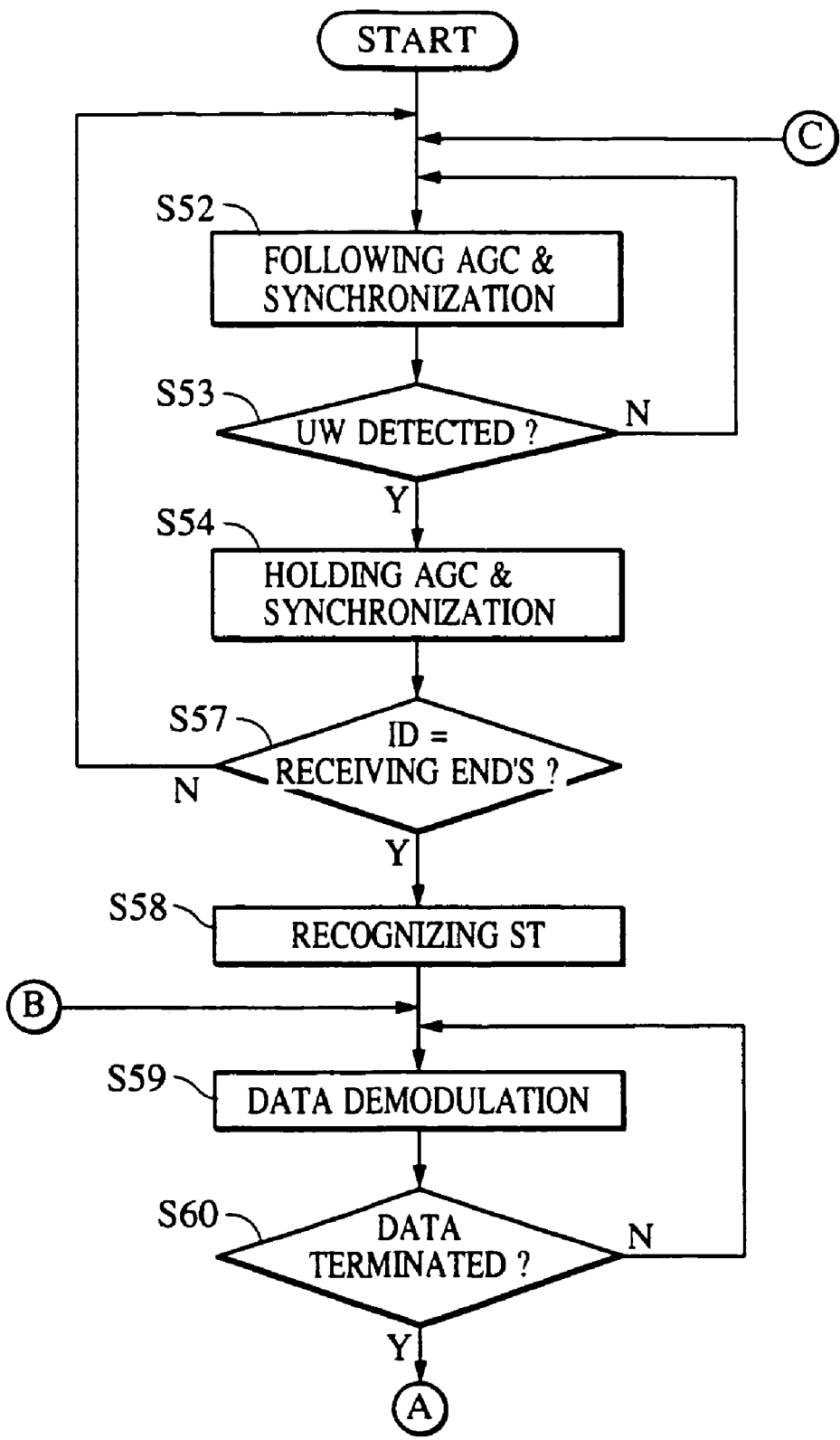
FIG. 11 is a flowchart showing a case where a preamble is being received in the third embodiment of the present invention.
Figure 12:
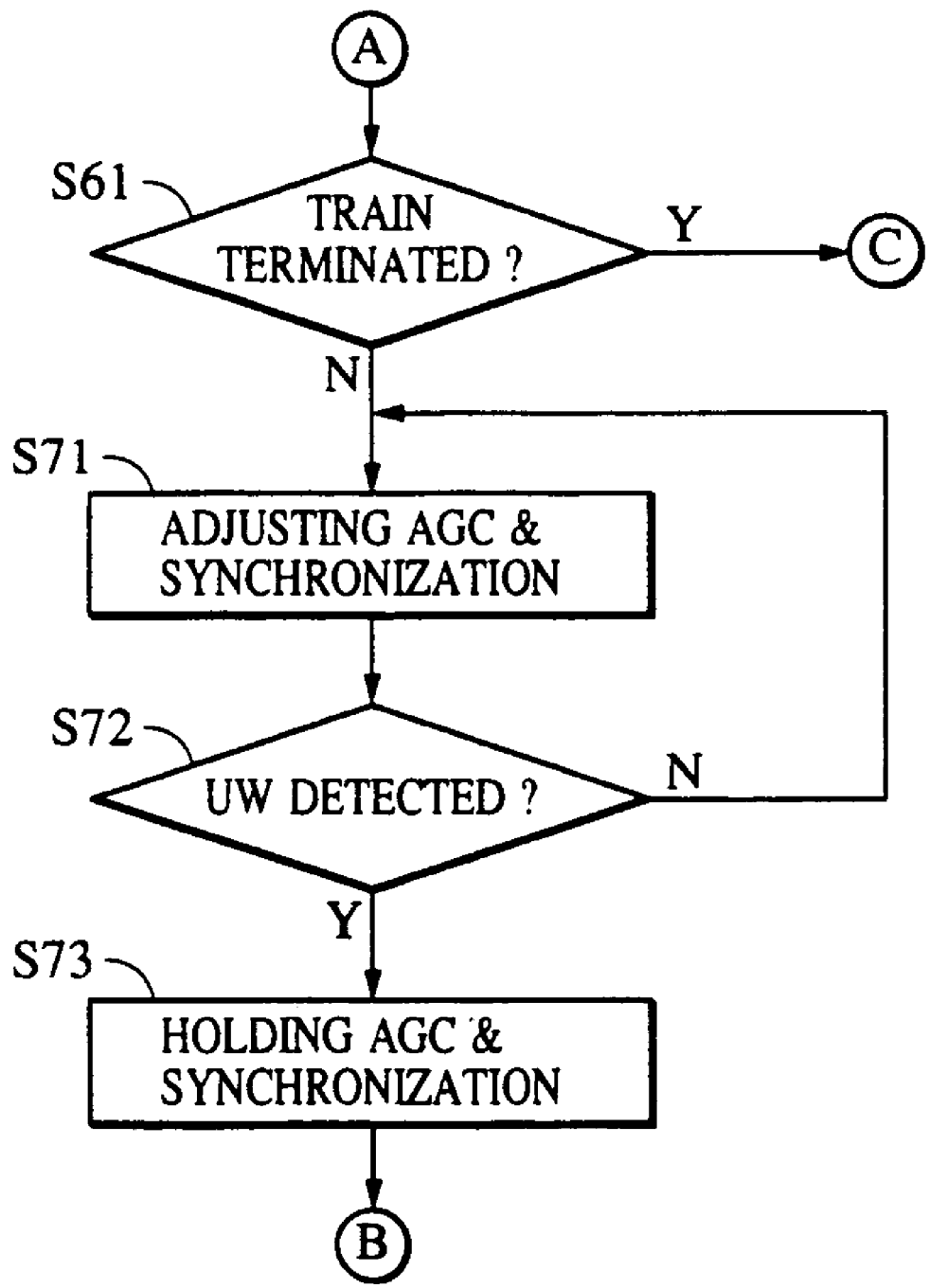
FIG. 12 is a flowchart showing a case where a mid-amble is being received in the third embodiment of the present invention.

FIGS. 11 and 12 show flowcharts of the operation of the receiving end when processing the above-described data burst. In an initial condition the timing generator 44F sets the selector 44G to the UW generator 44D. When the data burst is received, in step S52 the AGC is acquired by the high-frequency processor 43 and the clock synchronization is established by the synchronizer 44A in accordance with the synchronization code. Successively, when the unique word (UW) is detected by the comparator 44E in step S53, the timing generator 44F performs setting so that in step S54 the high-frequency processor 43 and the synchronizer 44A hold the AGC and the clock synchronization.

The timing generator 44F also sets the selector 44G to the ID generator 44B. In addition, when the comparator 44E detects that the station-identification code (ID) received in step S57 is addressed to the receiving end (i.e., to this particular receiver), the timing generator 44F recognizes the status input from the SS demodulator 44C in the subsequent step S58. The SS demodulator 44C demodulates the data in step S59, and performs setting so that the demodulated data is output to the upper layer 45 until it detects the end of the data in step S60.

The length and number of the groups of data (DA) are included in the status (ST) recognized in step S58. The timing generator 44F controls the reception sequence, based on them.

In addition, by sending the status (ST) to the upper layer 45, notification of the end of the data and the end of the train may be given from the upper layer 45.

If in step S61 the end of the train is not detected, or when a mid-amble (MD) and data group (DA) are received after reception of a preceding data group (DA), the previously established AGC and synchronization held in steps S52 and S54 are adjusted in step S71 in accordance with the synchronization code (SY) of the mid-amble (MD). When the unique word (UW) of the mid-amble (MD) is detected in step S72, the AGC, the synchronization and so forth are held in step S73, the process returns to step S59. If the SS demodulator 44C detects the end of the train, the process returns to step S52. Also, if it is found in step S57 that the station-identification code (ID) detected by the SS demodulator 44C is not addressed to the receiving end, the process returns to step S52.

The acquisition of the clock synchronization and the AGC has been established in the preamble period. Thus, the clock synchronization in the mid-amble period is sufficiently achieved by only phase correction, and the need for the initial acquisition of the AGC is eliminated. Accordingly, the synchronization code (SY) in the mid-amble (MD) may be shorter than the synchronization code (SY) in the preamble (PR) period. The high-frequency processor 43 increases the gain in step S52 so that the AGC is rapidly acquired, and in step S71 the gain is reduced to precisely adjust the AGC. The synchronizer 44A increases the acquisition gain in step S52, and decreases it in step S71.

Figure 13:
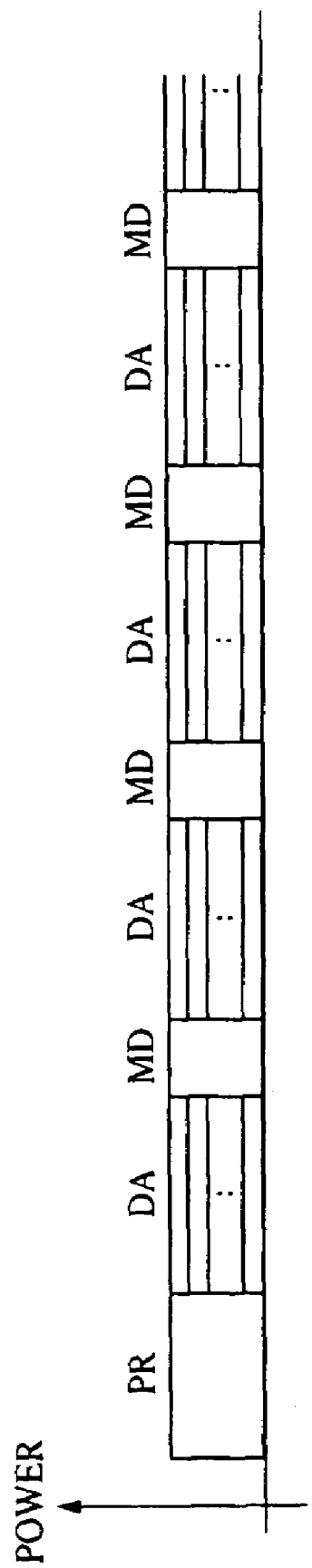
FIG. 13 is a chart showing the format of data bursts according to a fourth embodiment of the present invention.

FIG. 13 shows the format of a data burst according to a fourth embodiment of the present invention.

The data burst shown in FIG. 13 includes a preamble (PR), data groups (DA) and one or a plurality of mid-ambles (MD). The preamble (PR) includes a synchronization code (SY), a unique word (UW), and a station-identification code (ID). The data (DA) is multiplexed by code division multiplexing. Each mid-amble (MD) includes a synchronization code (SY). A CDM communication method, which is one spread-spectrum communication method used to improve data throughput, uses N mutually orthogonal codes to perform the frequency-axially spread multiplexing of data, and sends the multiplexed data.

Figure 4B:
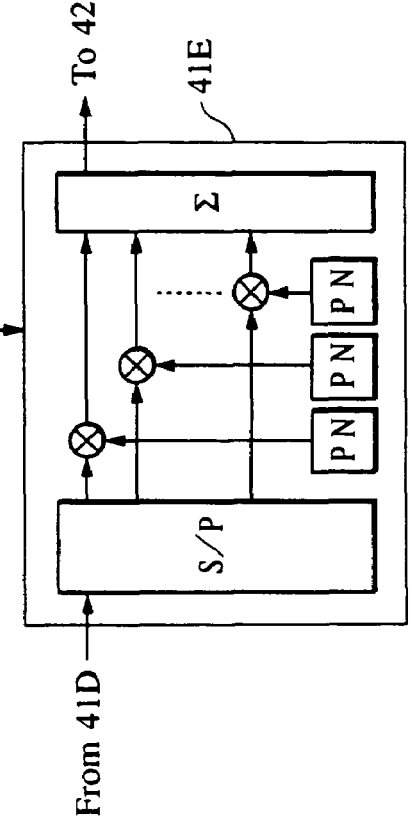

According to the fourth embodiment, the SS modulator 41E has a structure as shown in FIG. 4B, and performs the code division multiplexing (CDM) of the data burst by using the spread-spectrum (SS) communication method.

In addition, the SS modulator 44C has a structure as shown in FIG. 5B, and uses N mutually orthogonal PN codes to perform the CDM reverse spreading of the code-division-multiplexed data. (The structures shown in SS modulators 41E and 44C are well known in themselves and need not be described; nonetheless, some details are noted below) Here, as shown in FIG. 10, by using a signal which is not multiplexed as a code in the preamble and the mid-amble, power consumed by the preamble and the mid-amble can be increased N times power per data channel, which means that synchronization establishing and AGC inputting, need not be greatly affected by a change in the communication quality of the transmission line.

Other operations of the receiving end may be performed by the processes shown in FIGS. 6, 7, 9, 11 and 12.

When a code-synchronous CDM communication method is used in the SS modulator 44E, the spread spectrum modulation and multiplexing (CDM) of the selector 41E output is performed using N mutually orthogonal PN (pseudo-noise) codes. In this case the modulator 41E selects a synchronization code $PN_0$ from spread codes $PN_0$ to $PN_n$, and outputs it as an SY code to the high-frequency processor 42, without performing the code division multiplexing of it.

The code-synchronous CDM communication method is a spread-spectrum communication method used to improve the data throughput, which uses N mutually orthogonal codes to perform the spread multiplexing of data onto a frequency, and sends the multiplexed data. When the data or the like formed by the CDM is received and demodulated, gain and synchronization are held by the receiving end.

The station-identification code (ID), the status (ST) and the unique word (UW) other than information data are transmitted using one spread code.

In the foregoing, although the present invention has been described based on the preferred embodiments thereof, the present invention is not limited to the structures of those embodiments but may be modified within the appended claims.

What is claimed is:

1. A spread spectrum communication apparatus comprising:
   communication means for communicating a spread spectrum signal divided into a plurality of data-communication periods; and
   adjustment-signal communication means for continuously communicating an adjustment signal for adjusting reception of the spread spectrum signal between one data-communication period and another communication period, such that the spread spectrum signal is continuously communicated, and
   wherein said adjustment-signal communication means communicates a first adjustment signal, prior to the plurality of data-communication periods, that is longer than the adjustment signal between the one data-communication period and the other data-communication period.

2. A spread spectrum communication apparatus according to claim 1, wherein the adjustment signal is a signal for adjusting the synchronization of a spread code.

3. A spread spectrum communication apparatus according to claim 1, further comprising adjustment means for establishing a setting of a receiving end in accordance with the first adjustment signal prior to the plurality of data-communication periods and correcting the established setting in accordance with the adjustment signal between the one data-communication period and the other data-communication period.

4. A spread spectrum communication apparatus according to claim 1, wherein the adjustment signal is a signal for adjusting gain.

5. A spread spectrum communication apparatus according to claim 1, wherein said data communication means communicates code-division-multiplexed data in the data-communication period.

6. A spread spectrum communication apparatus according to claim 5, wherein said adjustment-signal communication means communicates an adjustment signal not multiplexed by code division multiplexing.

7. A spread spectrum communication apparatus according to claim 1, wherein gain caused by adjustment in accordance with the first adjustment signal prior to the plurality of data-communication periods is larger than gain caused by adjustment in accordance with the adjustment signal between the one data-communication period and the other data-communication period.

8. A spread spectrum communication apparatus according to claim 2 further comprising holding means for holding a setting in a receiving end in the data-communication period.

9. A spread spectrum communication apparatus comprising:
- data transmission means for transmitting a plurality of sets of data on a spread spectrum signal;
- information transmission means for transmitting, between each two successive sets of data, information to be used by a receiving and for receiving the later one of the two successive sets of data, such that the spread spectrum signal is continuously transmitted,
- wherein said data transmission means transmits the sets of data by code division multiplexing, and said information transmission means transmits information which is not multiplexed by code division multiplexing, and
- wherein said information transmission means transmits first information prior to the sets of data, wherein a transmission period of the first information is longer than that of the information between each two successive sets of data.

10. A spread spectrum communication apparatus according to claim 9, wherein said information transmission means transmits information for synchronizing a spread code.

11. A spread spectrum communication apparatus according to claim 9, wherein said information transmission means transmits information for adjusting gain.

12. A spread spectrum transmission apparatus comprising:
- transmission means for transmitting a continuous spread spectrum signal including a plurality of data-communication periods,
- wherein said transmission means further transmits an adjustment signal for adjusting synchronization, in the continuous spread spectrum signal, between one of the plurality of data-communication periods and another one of the plurality of data-communication periods,
- and wherein said transmission means transmits a first adjustment signal prior to the plurality of data-communicating periods, wherein the first signal is longer than the signal transmitted between said one data-communication period and said another data-communication periods.

13. A spread spectrum transmission apparatus according to claim 12, wherein said transmission means transmits a signal for adjusting gain between said one of the plurality of data-communication periods and said another one of the plurality of data-communication periods.

14. A spread spectrum transmission apparatus according to claim 12, wherein said transmission means transmits a code-division multiplexed signal in-the plurality of data-communication periods; and the adjustment signal is not multiplexed by code division multiplexing.

15. A spread spectrum communication apparatus comprising:
- data transmission means for transmitting a plurality of sets of data on a spread spectrum signal;
- information transmission means for transmitting, between each two successive sets of data, information to be used by a receiving end for receiving the later one of the two successive sets of data, such that the spread spectrum signal is continuously transmitted,
- wherein said information transmission means transmits first information prior to the sets of data, wherein a transmission period of the first information is longer than that of the information between each two successive sets of data.

16. A spread spectrum communication apparatus according to claim 15, wherein said information transmission means transmits information for synchronizing a spread code.

17. A spread spectrum communication apparatus according to claim 15, wherein said information transmission means transmits information for adjusting gain.

18. A spread spectrum communication apparatus according to claim 15, wherein said data transmission means transmits the groups of data by code division multiplexing, and said information transmission means transmits information which is not multiplexed by code division multiplexing.

19. A spread spectrum communication apparatus comprising:
- communication means for communicating a spread spectrum signal divided into a plurality of data-communication periods;
- adjustment-signal communication means for continuously communicating an adjustment signal for adjusting reception of the spread spectrum signal between one data-communication period and another communication period, such that the spread spectrum signal is continuously communicated, and for communicating a first adjustment signal prior to the plurality of data-communication periods; and
- adjustment means for establishing a setting of a receiving end in accordance with the first adjustment signal prior to the plurality of data-communication periods and correcting the established setting in accordance with the adjustment signal between the one data-communication period and the other data-communication period,
- wherein the first adjustment signal is longer than the adjustment signal between the one data-communication period and the other data-communication periods.

* * * * *

UNITED STATES PATENT AND TRADEMARK OFFICE
CERTIFICATE OF CORRECTION

PATENT NO.        : 7,035,232 B1
APPLICATION NO.   : 09/661152
DATED             : April 25, 2006
INVENTOR(S)       : Rie Suzuki It is certified that error appears in the above-identified patent and that said Letters Patent is hereby corrected as shown below:

DRAWINGS:
Sheet 5, Figure 6, in step S14, "TERMINES ?" should read -- TERMINATES ? --.

COLUMN 5:
Line 9, "entirely)," should read -- entirety), --.

COLUMN 8:
Line 1, "below)" should read -- below). --; and
Line 46, "and" should be deleted.

COLUMN 9: Claim 8
Line 17, "claim 2" should read -- claim 1, --;
Line 25, "and" should read -- end --;

COLUMN 10: Claim 14
Line 6, "in-the" should read -- in the --.

Signed and Sealed this

Twentieth Day of March, 2007

JON W. DUDAS
*Director of the United States Patent and Trademark Office*